(12) United States Patent
Taing

(10) Patent No.: US 12,375,765 B2
(45) Date of Patent: Jul. 29, 2025

(54) CONTRIBUTED MEDIA STREAM SYSTEM AND METHOD

(71) Applicant: James B. Taing, Milford, CT (US)

(72) Inventor: James B. Taing, Milford, CT (US)

(73) Assignee: James B. Taing, Milford, CT (US)

( * ) Notice: Subject to any disclaimer, the term of this patent is extended or adjusted under 35 U.S.C. 154(b) by 79 days.

(21) Appl. No.: 18/336,645

(22) Filed: Jun. 16, 2023

(65) Prior Publication Data

US 2024/0422392 A1    Dec. 19, 2024

(51) Int. Cl.
*H04N 21/472* (2011.01)
*H04N 21/2187* (2011.01)

(52) U.S. Cl.
CPC ....... *H04N 21/472* (2013.01); *H04N 21/2187* (2013.01)

(58) Field of Classification Search
None
See application file for complete search history.

(56) References Cited

U.S. PATENT DOCUMENTS

| | | | |
|---|---|---|---|
| 11,093,120 B1* | 8/2021 | Paul | G06F 3/0484 |
| 2013/0125175 A1* | 5/2013 | Hao | H04N 21/4882 725/62 |
| 2016/0285921 A1* | 9/2016 | Savostiyanov | H04L 65/1093 |
| 2020/0286004 A1* | 9/2020 | Backer | H04L 67/52 |

\* cited by examiner

*Primary Examiner* — James R Marandi
(74) *Attorney, Agent, or Firm* — Slater Matsil, LLP

(57) ABSTRACT

A user contributed content system includes a server and a user contributor. The system performs processes to manage contributors and recordings from the contributors, the recordings being sections of a resource. The user contributed content system combines the recordings together and produces a live distributed performance of the resource.

20 Claims, 11 Drawing Sheets

CONTRIBUTED MEDIA STREAM SYSTEM AND METHOD

BACKGROUND

Distribution of media content to electronic devices may include live or on-demand media sources. Content may be provided from a server to a client utilizing network services to transmit content from the server and receive the content on the client. Live media sources are created by a media content creator in real-time and provided in a single stream from the server to the client. On-demand media sources are created by a media content creator ahead of time and provided in a single stream from the server to the client.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One embodiment includes sending a first prompt to a first contributor device. The method also includes receiving a first recording in response to the first prompt from the first contributor device. The method also includes sending a second prompt to a second contributor device. The method also includes receiving a second recording in response to the second prompt from the second contributor device. The method also includes appending the second recording to the first recording. The method also includes and providing the first recording and the second recording in a media stream. Corresponding computer systems, apparatus, and computer programs recorded on one or more computer storage devices, each configured to perform the actions of the methods may also be included.

Implementations may include one or more of the following features. The method may include: prior to sending the first prompt, popping the first contributor device from a contributor queue; and shifting the contributor queue to put the second contributor device at a front of the contributor queue. The method may include: receiving a selection from a third contributor device, the selection indicating a first resource section for reservation; marking the first resource section as reserved for the third contributor device; receiving a selection from a fourth contributor device, the selection indicating the first resource section for reservation; marking the first resource section as reserved for the fourth contributor device; and providing a payment or a point value to the third contributor device. While marking the first time range as reserved, a current time is before the first time range; when the current time is within the first time range, sending a third prompt to the third contributor device; and receiving a third recording in response to the third prompt from the third contributor device; and appending the third recording to the media stream. The method may include: adding a third contributor device to a contributor queue; adding a fourth contributor device to the contributor queue, the fourth contributor device being added to the contributor queue in a position before the third contributor device; and appending a recording received from the third contributor device to the media stream after a recording received from the fourth contributor device. The second recording and the third recording represent a performance of a same section of a resource. The third contributor device and the second contributor device are different devices. Implementations of the described techniques may include hardware, a method or process, or computer software on a computer-accessible medium.

Another embodiment includes receiving, on a first device, a list of contributor ids from a server, the list including a first contributor id associated with the first device. The method also includes receiving, on the first device, a media stream, the media stream including a first media element originating from a second device associated with a second contributor id associated with the second device. The method also includes receiving, on the first device, a prompt from the server and processing the prompt on the first device to cause the first device to display an interface including a video display region, the video display region displaying a preview view of a video input associated with the first device. The method also includes recording, on the first device, a second media element from the video input and sending the second media element to the server. The method also includes receiving, on the first device, a confirmation from the server that the second media element was received. The method also includes and receiving, on the first device, the media stream, the media stream including the second media element. Corresponding computer systems, apparatus, and computer programs recorded on one or more computer storage devices, each configured to perform the actions of the methods may also be included.

Implementations may include one or more of the following features. The method may include: selecting a resource section, the resource section being a portion of a resource, the resource section corresponding to the second media element; reserving the resource section; and prior to receiving the prompt from the server, receiving a notification from the server to request information from the server regarding the resource section. Reserving the resource section includes purchasing the resource section from another contributor. A current time falls within a second time range before the first time range; waiting until the current time falls within the first time range; and receiving a notification from the server to request information from the server regarding the media stream. The method may include: submitting a payment to reserve the first time range. The list of contributor ids represents an ordered list of contributors, may include: requesting, to the server, to be added to a position in the list of contributor ids which is not at a back of the list of contributor ids. When the position is within a first number of positions from a front of the list of contributor ids, a first price is associated with the request, and when the position is within a second number of positions after the first number of positions, then a second price is associated with the request, where the first price is greater than the second price. Implementations of the described techniques may include hardware, a method or process, or computer software on a computer-accessible medium.

Another embodiment includes a device including: a processor, a computer-readable medium, and a first set of instructions stored in the computer-readable medium, which when executed by the processor, cause the device to: receive a first recording from a first contributor device, append the first recording to a live media stream, receive a second recording from a second contributor device, and append the second recording to the live media stream immediately following the first recording, where the live media stream includes a partial performance of a first source material, the partial performance including a first performance from the first recording and a second performance from the second recording. Corresponding computer systems, apparatus, and computer programs recorded on one or more computer storage devices, each configured to perform the actions of the methods may be included.

Implementations may include one or more of the following features. The device where the first set of instructions, when executed by the processor, further cause the device to: split the first source material into a plurality of source sections, where the first performance corresponds to a first source section of the plurality of source sections, where the second performance corresponds to a second source section of the plurality of source sections; and provide a list of the plurality of source sections to a contributor device. The first set of instructions, when executed by the processor, further cause the device to: maintain a correspondence between a queue of contributor devices and the plurality of source sections such that the first contributor device at a beginning of the queue corresponds to the first source section, the second contributor device after the first contributor device in the queue corresponds to the second source section, a third contributor device after the second contributor device in the queue corresponds to a third source section, where the third source section immediately follows the second source section in the first source material. Maintaining the correspondence between the queue of contributor devices and the plurality of source sections includes moving the second contributor device to be in front of the third contributor device. The first set of instructions, when executed by the processor, further cause the device to: place the third contributor device in the queue of contributor devices; after placing the third contributor device, assign the second source section to the second contributor device; and after assigning the second source section to the second contributor device, moving the second contributor device to be in front of the third contributor device. The first set of instructions, when executed by the processor, further cause the device to: provide the live media stream to the second contributor device; and trigger the third contributor device to send a third recording, the third recording corresponding to the third source section. Implementations of the described techniques may include hardware, a method or process, or computer software on a computer-accessible medium.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
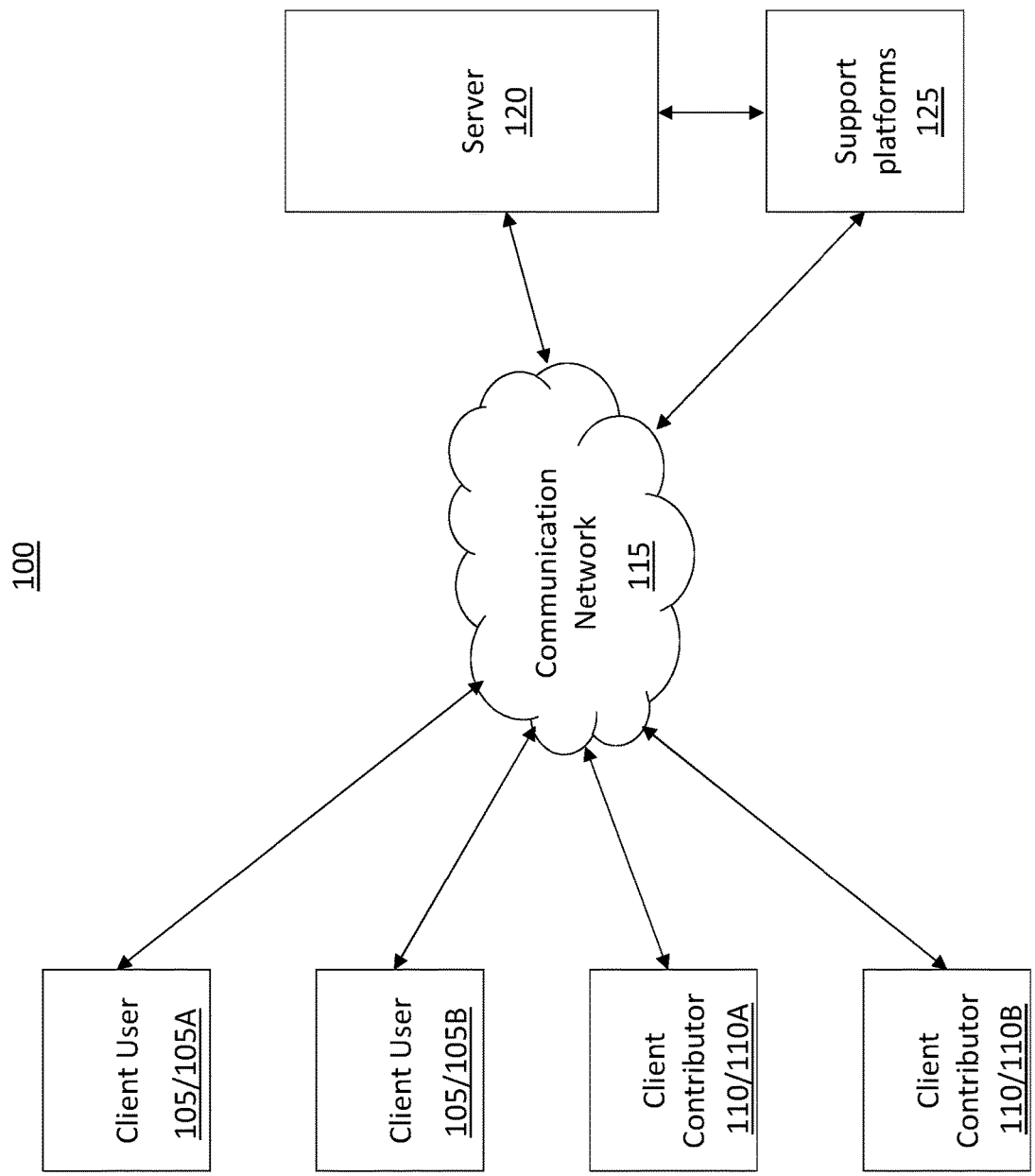
FIG. 1 is a block diagram of an example network environment that supports user contributed video streaming, in accordance with some embodiments.

Embodiments of the present invention form and provide a user-contributed media stream. A resource may be broken up into various parts, sections, or segments and provided to a set of user contributors (referred to as "contributors"). The resource may be, for example, a book, a script, a play, a report, a narrative, a collection of books, and so forth. Each of the contributors may queue to present their segment of the resource. Each of the contributors may then, in turn, perform or read their section in a live media feed. A system aggregates the various live media feeds from the contributors and negotiates each of the live media feeds to a master live stream. The master live stream can be made available and provided for user clients to stream. The master live stream can be stored and made available on-demand.

Thus, the master live stream represents a live collaborative performance from many different users in many different places of a resource, such as a book. Such a collaborative performance encourages participation from users to achieve the final performance and engage with the material in a meaningful context. The examples illustrated and discussed below discuss the book Beowulf. This book is commonly assigned to High School English classes. A cohort of High School students can, for example, use embodiment processes to collectively and collaboratively read the book together from different locations at an agreed upon time. Another example resource may be the Bible or another religious text. Followers of a religion that encourages reading of religious texts can jointly participate in the presentation of a religious text. Such joint participation can encourage the followers to contribute to the performance of reading the religious text or encourage the followers to consume the content of the performance of reading the religious text. One goal for contributors to the master live stream of a religious text may be to provide a non-stop live collaborative performance of the entire religious text. Another example resource may be a script, such as for a screen play or stage play. The script may be broken up into parts and those parts performed by various contributors.

Embodiments further provide the ability for contributors to reserve particular parts or sections of the resource. For example, contributors can reserve particular time slots or particular passages (or resource section) of the resource. Embodiments also provide a staging interface for contributors to wait for their turn to record their part or section of the resource. The contributors can practice capturing their still or video image and voice in the staging interface. The staging interface can include a staging area including a reading list or queue of the parts or sections and an estimated time or wait for when it will be the turn of the contributor to read their part. Embodiments may further provide a recording interface for capturing a contributor's video and/or audio and a text prompt for the text to be read for that section or part of the resource. The contributor may be prompted when it is time to record so that the staging interface is replaced with the record interface. Then the user may be given an opportunity to record their part or section of the resource. The system can receive the recording and negotiate it to a master live stream.

Embodiments further provide a streaming interface where user clients can view the master live stream. The streaming interface can also provide a visual representation of the reading queue, for example, showing a list of upcoming segments of the resource.

This disclosure is discussed in the context of reading a book. It should be appreciated, however, that the system is not limited to this particular resource (book), but that any resource may be utilized.

FIG. 1 is a block diagram of an example network environment 100 that supports user contributed video streaming. The network environment 100 is includes multiple client users 105, such as client user 105A and client user 105B, multiple client contributors 110, such as client contributor 110A and client contributor 110B, a communication network 115, and a server 120, all of which work together to enable data exchange and management. Each of the client users 105 and client contributors 110 are client devices which are bi-directionally connected to the communication network 115, meaning that they can send and receive data to and from the network. The server 120 is representative of any number of servers which may be locally connected to each other or which may utilize connections through the communication network 115. The server 120 is bi-directionally connected to the communication network 115. The communication network 115 may be the Internet. Thus, client users 105 and client contributors 110 may access the server 120 through the communication network 115. Likewise, the server 120 may provide information to the client users 105 and client contributors 110 through the communication network.

The bi-directional communication between client users 105 and client contributors 110 and the server 120 through the communication network 115 may utilize any suitable communication protocol, such as an Internet protocol, which may include Transmission Control Protocol/Internet Protocol (TCP/IP), Hypertext Transfer Protocol (HTTP), etc., and other non-limiting protocols herein.

The server 120 may utilize support platforms 125, which may be other servers, content delivery network (CDN) providers, encoders, databases, and so forth. The support platforms 125 may also be bi-directionally coupled to the communication network 115 and may provide information directly (by way of the communication network 115) to the client users 105 or client contributors 110 without having to use the server 120 as an intermediate device. In some embodiments, the support platforms 125 may be locally connected to the server 120, and/or in some embodiments, the support platforms 125 may be connected to the server 120 by the communication network 115. If locally connected, the local connection may also utilize the same types of communication protocols as the communication network 115.

Figure 2B:
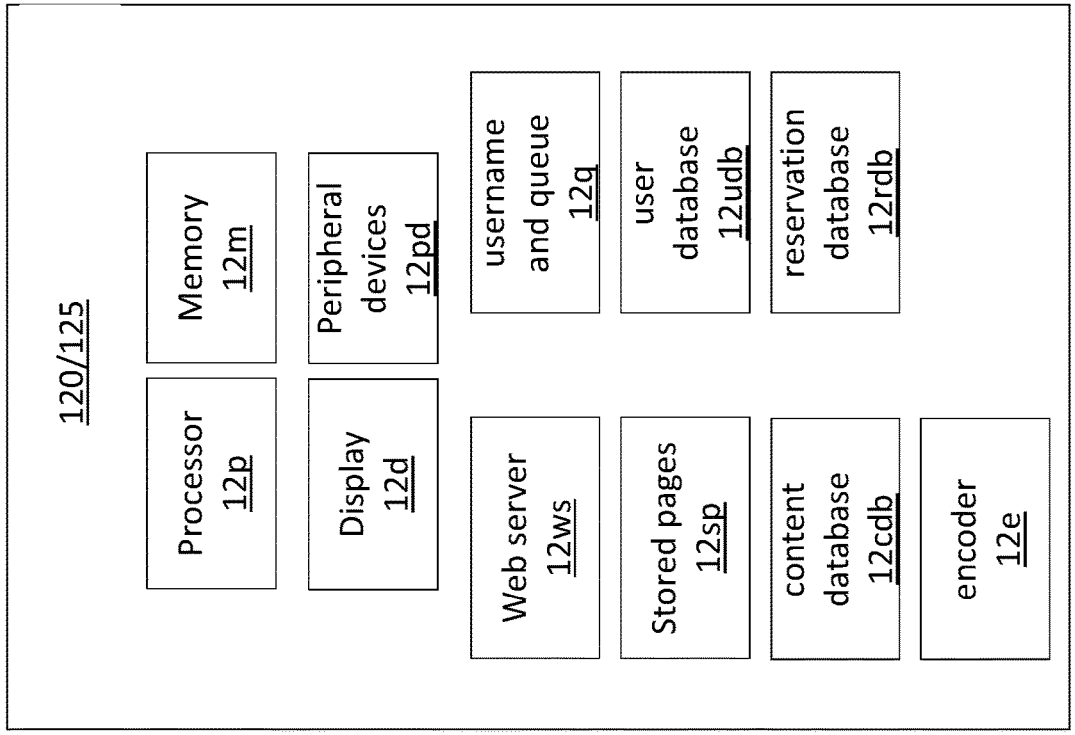
FIG. 2B illustrates a block diagram for a server and/or support platforms, in accordance with some embodiments.
Figure 2A:
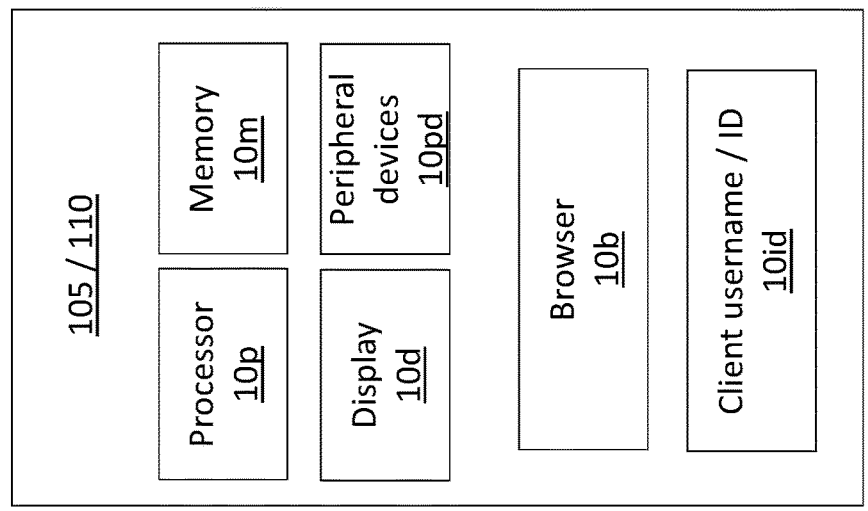
FIG. 2A illustrates a block diagram for a client user and/or client contributor device, in accordance with some embodiments.

FIG. 2A illustrates a block diagram for a client user 105 and/or client contributor 110 device (i.e., client 105/110). Client 105/110 may be capable of wireless and/or wired communication with network services over communication network 115, and includes processing, storage, communication, and user interface capabilities sufficient to provide all of the client device functionality described herein. Such functionality may be provided, at least in part, by one or more client applications, such as computer programs, that execute on client 105/110. In particular, the client 105/110 includes one or more processors $10p$, memory devices $10m$, displays $10d$, and peripheral devices $10pd$. The memory devices $10m$ include non-transitory computer readable memory that stores instructions which, when executed on the processor $10p$ cause the display $10d$ to display web pages, for example, by a web browser $10b$ application. The processor $10p$ can also execute instructions from the memory devices $10m$ to take input data from the peripheral devices $10pd$ and utilize the input data and/or provide output data to peripheral devices. The peripheral devices $10pd$, for example, may include speakers, microphones, video cameras, keyboards, computer mice, network interfaces, and so forth. The client 105/110 may include a client username or identifier ("id") which provides a unique way to differentiate one client 105/110 from another client 105/110. In an embodiment, the browser $10b$ can download and execute instructions which include an interactive user interface for displaying the client-side elements of the user-contributed content creation system (CCS) 150 (see FIG. 3). The browser $10b$ is representative of any application that can access the CCS 150, such as for example, an app installed on a smartphone or tablet.

FIG. 2B illustrates a block diagram for a server 120 and/or support platforms 125 (i.e., server 120/125). The server 120/125 may be capable of wireless and/or wired communication with network services over communication network 115, and includes processing, storage, communication, and user interface capabilities sufficient to provide all of the server device functionality described herein. Such functionality may be provided, at least in part, by one or more server applications, such as computer programs, that execute on server 120/125. In particular, the server 120/125 includes one or more processors $12p$, memory devices $12m$, optional displays $12d$, and peripheral devices $12pd$. The peripheral devices $12pd$, for example, may include speakers, microphones, video cameras, keyboards, computer mice, network interfaces, and so forth. The memory devices $12m$ include non-transitory computer readable memory that stores instructions which, when executed on the processor $12p$ cause server 120/125 to send web pages, receive web requests, send or receive video data, manage the CCS 150 (see FIG. 3), and so forth. It should be understood that the functional blocks for web server $12ws$, username and queue $12q$, stored pages $12sp$, user database $12udb$, content database $12cdb$, reservation database $12rdb$, and encoder $12e$, may be distributed across multiple servers 120 or support platforms 125. Sending web pages and receiving web requests may be performed by the web server $12ws$, which can retrieve stored pages $12sp$ and data from username and queue $12q$, the user database $12udb$, the content database $12cdb$, and/or the reservation database $12rdb$. Data can be transferred in or out of the server 120/125 by the peripheral devices $12pd$, such as by network interfaces. The encoder $12e$ can encode or transcode video and/or audio data into a media stream.

Figure 3:
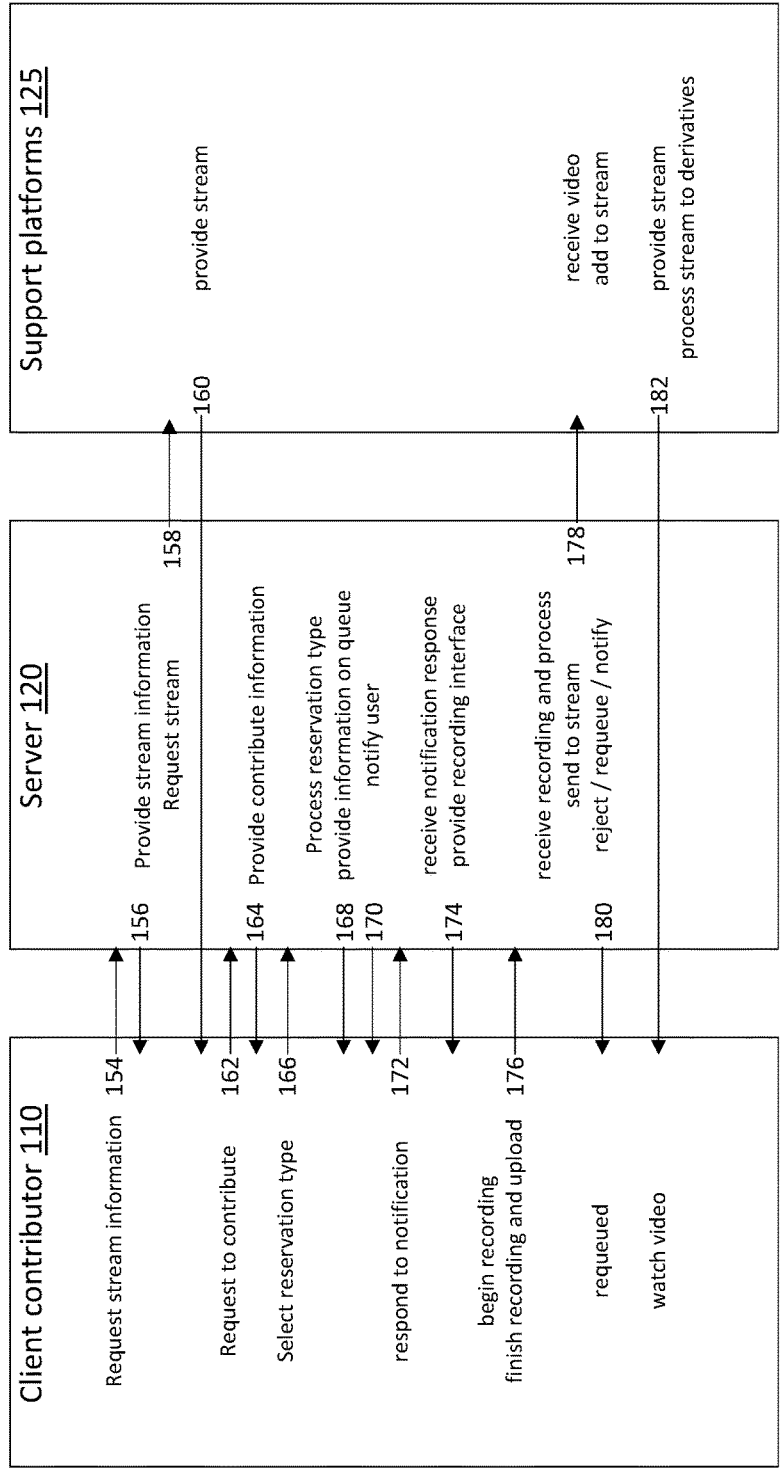
FIG. 3 illustrates a user-contributed content creation system (CCS), in accordance with some embodiment, in accordance with some embodiments.

FIG. 3 illustrates a user-contributed content creation system (CCS) 150. The CCS 150 includes at least one client contributor 110 (contributor 110), a server 120, and support platforms 125. The contributor 110 is preferably one of many contributors and may be taken as representative of a plurality of contributors 110. The contributor 110 may be an end user device which provides content for a user contributed media stream. Other clients may include a client user 105 (see FIG. 1) (user 105) which can also access the media stream. The contributor 110 provides video and/or audio content to the server 120. The server 120 is representative of a server system which may include multiple server devices and applications executing thereon which cause the various processors of the server 120 to provide information to the contributor 110, receive requests from the contributor 110, receive video and/or audio content from the contributor 110, curate and combine the content from various contributors 110 into a media stream, and cause the stream to be published to a master live stream. The support platforms 125 may include databases, encoders, content delivery applications, and so forth which can provide information or services to the server 120. While basic descriptions have been provided for the client contributor 110, server 120, and support platforms 125, it should be understood that these descriptions are non-limiting and that additional functions may be provided by one or more of the client contributor 110, server 120, and support platforms 125 in accordance with the further descriptions below.

At element 154, a contributor 110 (i.e., a device associated with a user contributor) can request stream information from a server 120. The stream information request can come through a website request, for example. The contributor 110, can for example, follow a link or type in a URL which will cause a browser of the contributor 110 to make a request to a web server associated with the server 120. In another embodiment, the stream information request can come through an application running on the contributor 110. In response, at element 156, server 120 can provide the stream information to the client contributor 110. The response can come in the form of, for example, information delivered on a web page or to an app on the contributor 110. The stream information can include details about the stream. For example, the stream information may include a title of the resource which is being curated by the server 120, a stream status of the master live stream, a schedule of the master live stream, a link or button to request information on how to contribute, and so forth. If the master live stream is active, The server 120 can make request 158 to the support platforms 125 to provide the master live stream to the contributor 110. At element 160 the support platforms 125 can provide the master live stream to the contributor 110.

At element 162 the contributor 110 can make a request to the server 120 to contribute to the master live stream. At element 164 the server 120 can provide information back to the contributor 110 on how to contribute to the master live stream. For example, the server 120 can provide information on how to join a queue of other contributors 110. The information provided by the server 120 on how to join the queue, may include reservation information, estimated wait times, information on available resource sections, information on master live stream progress, etc. At element 166, the contributor 110 can select a reservation type. For example, the contributor 110 can select a time slot for providing live recorded content To the server 120 for inclusion into the master live stream. Or in another example, the contributor 110 can select a particular section of the resource for providing live recorded content to the server 120 for inclusion into the master live stream. Or in another example, the contributor 110 request to be added to the end of the current queue. Or in another example, the contributor 110 can request a particular section of the resource to be performed at a particular time slot, and indicate a preference for whether the resource section or whether the time slot is more important.

The server 120 can then process the reservation type, that is, adding the ID or username of the contributor 110 to the queue, time slot, or resource section. In some embodiments, the server 120 can exchange information with the contributor 110 about requiring a kind of payment depending on the reservation type, the reservation time slot, or the resource section. The payment can be a monetary payment or can be based on a credit or reputation system. The reservation system will be described in greater detail below.

At element 168, the server 120 can provide information to the contributor 110 on the queue. For example, the server 120 can provide a truncated listing of the current or upcoming contributors 110 (usernames or IDs) and their estimated wait times. The contributor 110 can display the queue information on its display along with the master live stream.

As the time approaches for the contributor 110 to provide live content for the master live stream, the server 120 can notify the user at element 170 that the time is nearing for them to provide their live content. The notification may be based on a time estimate or may be based on a queue position. For example, when the contributor 110 is about 30 minutes out, based on an estimated time calculated by the server 120, the server 120 can send a notification to the contributor 110. Or in another example, when the contributor 110 is about 6 queue slots away from their turn, the server 120 can send a notification to the contributor 110. The provided time or number of queue slots are examples, and not meant to be limiting. At element 172, the contributor 110 can respond to the notification to verify that the contributor 110 will be available at the estimated time or queue slot. If the server 120 does not receive a response, the server 120 can resend a notification. The server 120 can send another notification and receive another response, as needed, for example, when the estimated time is closer, such as about 5 minutes, or when the queue slot is sooner such as about 2 slots away.

As a part of the response to the notification, the contributor 110 can enter a staging area where the server 120 can provide a staging interface, showing the queue and showing a preview of the content stream. For example, a person associated with the contributor 110 can be shown a preview of a camera input of the contributor 110 and a preview of the section to be read, so that the person can position themselves in the camera frame and practice performing the section until their time or queue position comes.

When the contributor 110 reaches the front of the queue, at element 174, the server 120 can provide a recording interface to the contributor 110. For example, a button may appear which allows the contributor 110 to begin sending data to the server 120. During recording the content, the user contributed media stream can be streamed by the contributor 110 to the server 120, in accordance with some embodiments. In other embodiments, the user contributed media stream can be recorded locally to the contributor 110, and then uploaded to the server 120 following completion of the recording. During recording the content, the server 120 can cause contributor 110 to display text corresponding to the resource section being read.

Upon receiving the recording, the server 120 can verify that the recording passes system and community standards. If the recording does pass, then the server 120 can provide, at element 178, the recording to the support platforms 125. The support platforms 125 can add the recording to the master live stream. If the recording does not pass, then the server 120 can, at 180, reject the stream, re-queue the contributor 110, and notify the contributor 110 that the recording did not pass the system and community standards. The server 120 can requeue the contributor 110 back at the top of the queue (next in line), at the back of the queue, or another place in the queue. If the server 120 reinserts the contributor 110 in the queue at some place other than the front, then the server 120 will move to the next queued contributor 110 to provide the resource section which was rejected.

After adding the recording to the master live stream, the support platforms 125 can provide the stream, at 182, to the contributor 110. The contributor 110 can then display the video. The support platforms 125 can also process the live master stream into derivatives. For example, the support platforms 125 can save the stream as an on-demand stream, create an audio only stream, edit the stream to reduce dead air, edit the stream to normalize the audio levels, edit the stream to apply video filters to the stream, provide the stream at different qualities, and/or provide the stream with different encoding parameters for optimization.

Figure 4:
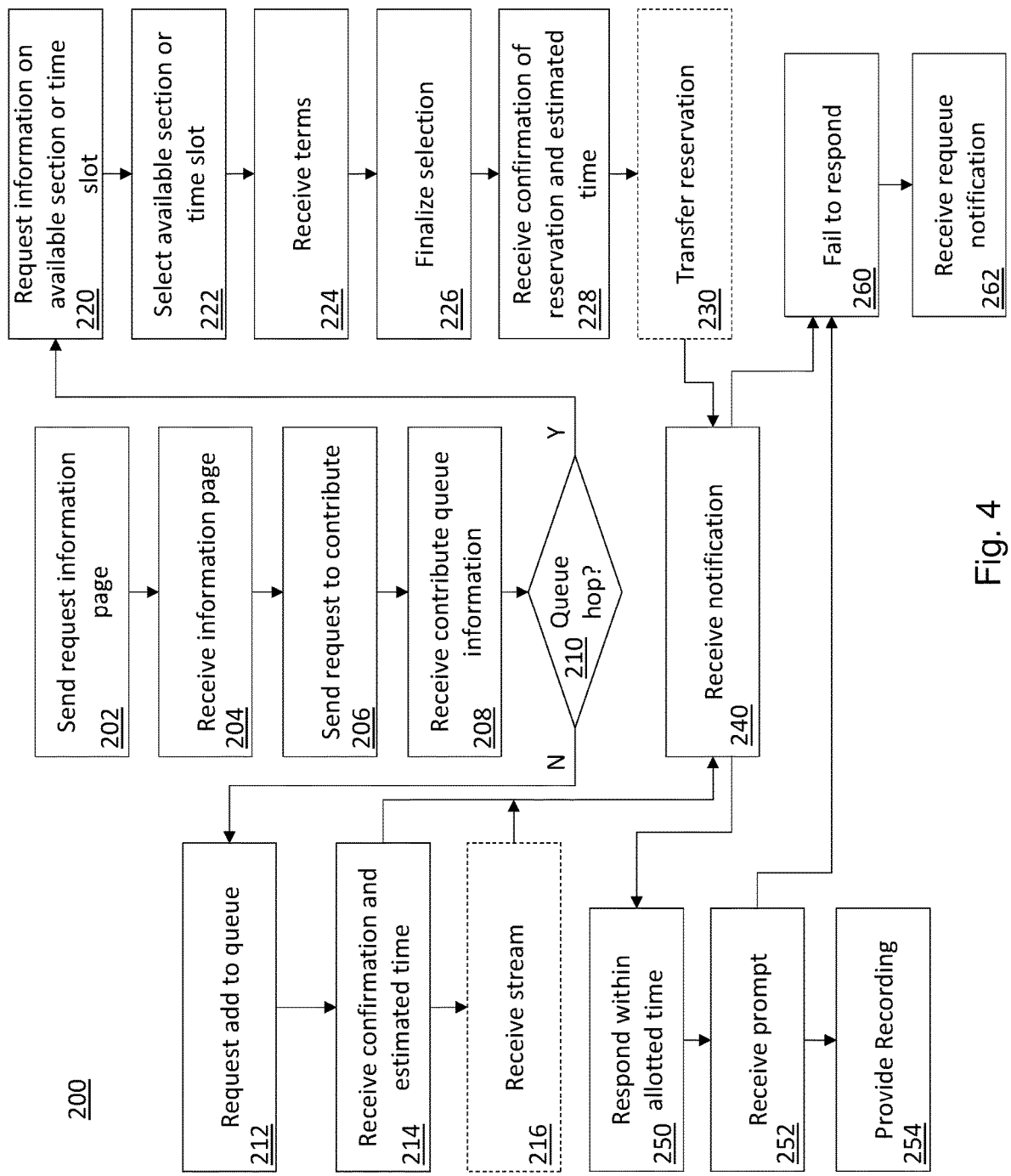
FIG. 4 illustrates a flow diagram for a process of a contributor providing content to a server that produces a user-contributed media stream, in accordance with some embodiments.

FIG. 4 illustrates a flow diagram for a process 200 of a contributor 110 providing content to a server that produces a user-contributed media stream. At 202, a request can be sent by the contributor 110 to the server 120 for an information page related to a collaborated performance of a resource. At 204, the contributor 110 can receive the information page from the server 120. The information can include details regarding the user-contributed media stream and code which the contributor 110 can use to display a visual representation of the information received. At 206, the contributor 110 can request to contribute to the user-contributed media stream. For example, the information received at 204 can include link information for submitting a request to contribute to the user-contributed media stream. In response, at 208, the contributor 110 can receive information from the server 120 about the resource and queue for contributing to the user-contributed media stream.

The information received at 208 can include information about how many contributors are in the queue, what the current expected wait time is, the usernames or IDs of the contributors in the queue, what percentage of the resource sections are reserved, what percentage the progress of the live master stream is, and so forth. The contributor 110 can make a determination at 210 as to whether the queue hopping is to be pursued. If not, then at 212, the contributor 110 can send a request to the server 120 to add the contributor 110 to the queue. Next, at 214, the contributor 110 can receive confirmation that the contributor 110 has been added to the queue and receive an estimated wait time based on the current queue. The contributor 110 can optionally receive the live master stream at 216 while waiting for the queue. Alternatively, the contributor 110 can go into an idle state or end the current session until a time closer to when the contributor 110 will be notified to return. In some embodiments, if the queue is empty, the contributor 110 can be prompted to go right to flow control element 252 and receive a prompt for the next resource section.

Returning to flow control element 210, if queue hopping is pursued, the flow will continue to 220 and information on queue hopping can be requested by the contributor 110 for an available section or time slot. The contributor 110 can then receive the information for the available resource sections or time slots.

Figure 6:
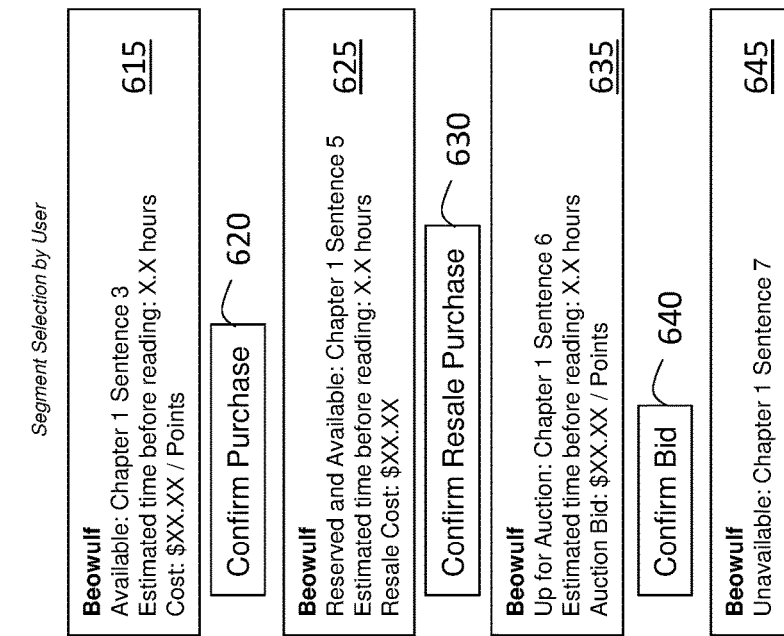
FIGS. 6 and 7 illustrate a user interfaces for information that can be received by the contributor for the available resource sections or time slots, in accordance with some embodiments.
Figure 7:
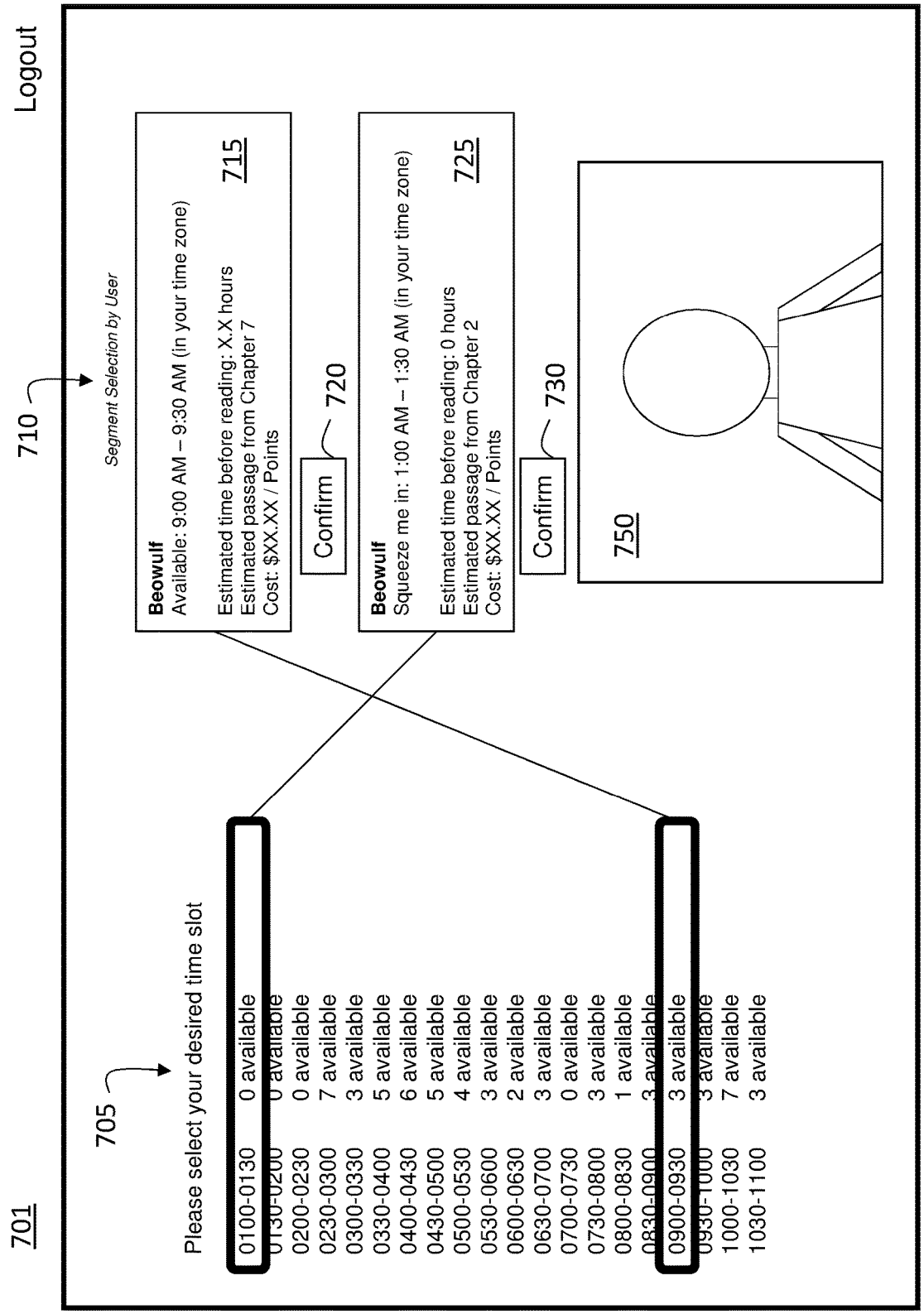

Turning briefly to FIGS. 6 and 7, FIGS. 6 and 7 illustrate a user interface 601 and user interface 701 that represents the information that can be received by the contributor 110 for the available resource sections or time slots. In FIG. 6, region 605 includes a selection of text from the resource, which in this example is a selection from Beowulf. The text can be presented in blocks or delineated sections based on where the sections break. The text in region 605 can also be color coded or differentiated by appearance to indicate the status of various sections. The statuses may be one of, for example, available, unavailable, reserved and available, reserved and unavailable, up for auction, or reserved and up for auction. It should be noted that these descriptors may be changed. "Available" indicates that the selected section is unreserved and available to be reserved. "Unavailable" indicates that the selected section is unavailable, which may be for various reasons, for example, it may be reserved by the system or by the queue manager. "Reserved and available" indicates that the selected section is reserved, but that the contributor that reserved it has listed it for sale or trade. "Reserved and unavailable" indicates that the selected section is reserved and that the contributor is not open to offers or trade. "Up for auction" indicates that the selected section is unreserved and available, but that it must be reserved by an auction format with the reservation going to the highest bidder. "Reserved and up for auction" indicates that the selected section has been reserved but that the contributor which reserved it has posted it as available by auction for transfer to the highest bidder.

Region 610 provides information on a selected resource section. For example, if chapter 1, sentence 3 of Beowulf is selected, then a pop-up detail 615 includes an available reservation type—in this example—indicated by the word "available," which indicates that the passage is available for reservation. The pop-up detail 615 further includes the passage details, such as the chapter and sentence, chapter and paragraph, chapter and verse, etc. The pop-up detail 615 further includes an estimated time before reading. This can be a value calculated by the server 120 and received by the contributor 110. The pop-up detail 615 also includes a cost to purchase the resource section. The cost could be a cash value which would have to be paid to reserve the resource section or it could be a point value which corresponds to an internally tracked virtual currency which can be based on money, reputation, user activity, or combinations thereof. The button 620 can be used to confirm purchase of the resource section.

Pop-up detail 625 is like unto the pop-up detail 615, but illustrates an example where the selected resource section is reserved and available by resale by the reservation owner. The cost of the reserved resource section can be set by the reservation owner. The allowed currency used to purchase the reserved resource section can be limited by the reservation owner. In the example embodiment, for example, the selected resource section can only be reserved by the payment of cash. The button 630 can be used to confirm purchase of the resource section.

Pop-up detail 635 is like unto the pop-up detail 615, but illustrates an example where the selected resource section is up for auction, for example, either by the system or by the reservation owner. A current auction bid can be displayed along with an entry field for inputting a bid. The auction end time can also be displayed. In some embodiments, a button can be pressed which would then provide a request to the server 120 for more details about the auction, such as usernames or IDs associated with the auction, and so forth. The allowed currency used to enter a bid can be limited by the system or the reservation owner. In the example embodiment, for example, the selected resource section can only be bid upon by the payment of cash or points. The button 640 can be used to confirm a bid for the resource section.

Pop-up detail 645 is like unto the pop-up detail 615, but illustrates an example where the selected resource section is unavailable. For example, the selected resource may already be reserved or may otherwise be unavailable as determined by the system. If it is already reserved, then the reservation owner has not made the resource section available for resale.

In FIG. 7, a user interface 701 is illustrated that represents the information that can be received by the contributor 110 for the available time slots. Similar to that explained above for the status of the resource section reservations discussed with respect to FIG. 6, the availability statuses for the time slots may be one of, for example, available, unavailable, reserved and available, reserved and unavailable, up for auction, or reserved and up for auction. The details for these types are the same for the time slots as for the resource reservations.

Region 705 displays options for time ranges. In FIG. 7, the time ranges are broken down into 30 minute lengths, though the time ranges may be more or less granular. In some embodiment, the ranges may be more granular (i.e., shorter time ranges) for times closer to a present time and less granular (i.e., longer time ranges) for times further from the present time. The contributor 110 can receive an estimate of how many time slots are available within the time range provided. For example, the range 0100-0130 indicates that 0 slots are available, while the range 0630-0700 indicates that 3 slots are available. The number of slots available in a time range can be affected by the consideration of the current queue, the resource section reservations, and the time slot reservations.

Region 710 provides information on a selected time range. For example, if chapter 0900-0930 is selected, then a pop-up detail 715 includes an available reservation type—in this example—indicated by the word "available," which indicates that a slot is available in the time range for reservation. The pop-up detail 715 further includes an estimated time before reading. This can be a value calculated by the server 120 and received by the contributor 110. The pop-up detail 715 may also include an estimated resource section associated with the time range, or in other words, a prediction of the chapter which will be read during that time range. The pop-up detail 715 also includes a cost to purchase the resource section. The cost could be a cash value which would have to be paid to reserve the resource section or it could be a point value which corresponds to an internally tracked virtual currency which can be based on money, reputation, user activity, or combinations thereof. The cost could be free. The button 720 can be used to confirm purchase of the time slot.

When 0 slots are available in a given range, in some embodiments, the contributor 110 can pay to jump the queue. When such a time range is selected, for example 0100-0130, then a pop-up detail 725 can allow the contributor 110 to squeeze into the slot. The slots may be unavailable, for example, because the current queue contains enough contributors to fill the time range. If one or more of the slots is unreserved, however, then the contributor 110 can pay to jump the queue to the front of the line (or to the front of the unreserved time slots). The server 120 can determine what the first available time slot is. This is discussed in greater detail below. The contributor 110 can also select to be squeezed into another time range toward the front of the queue. The cost may be determined by how close to the front the contributor 110 skips to, by how many other contributors are skipped, by flat rate, by a combination thereof, or by other factors. The button 730 can be used to confirm purchasing the time slot.

The current live master stream can optionally be displayed at media window 750 (as well as for the interface 601).

Returning to flow control element 222, the contributor 110 can select a resource section or time slot, as explained with respect to FIGS. 6 and 7. Next, at 224, terms for the resource section or time slot can be received. The terms may include payment information, auction information, point information, and so forth. Then at 226, the contributor 110 can finalize the selected resource section or time slot and send a request to the server 120 indicating the finalization of the selected resource section or time slot. Then at 228, the contributor 110 can receive confirmation of the reservation and estimated time information.

At 230, the contributor 110 can optionally transfer the reservation (i.e., the resource reservation or time slot reservation). The contributor 110 can transfer the reservation by any suitable means, such as by gifting it, selling it, auctioning it, or by canceling the reservation to returning its status to available.

At 240, the contributor 110 can receive a notification that the time is approaching for the contributor 110 to provide a performance of the resource section. Notification can be received for reserved resource sections or reserved time slots, as well as for queue waiting. Notification can be that the contributor 110 was moved in the queue, for example, because the contributor 110 was bumped by a resource section reservation or a time slot reservation to move in the queue. For example, if the contributor 110 is waiting in a staging area to provide the performance of the resource section, the contributor 110 may be notified that the passage that will be performed is changed.

If, at 250, the contributor 110 responds to the notification within an allotted time, then the contributor, at 252, will receive a staging interface which includes a prompt for the resource section. The contributor at 254 provides the recording. If the contributor 110 fails to respond, at 260, to the notifications received within the allotted time, fails to respond to the staging interface, or fails to provide the recording, then the contributor 110 may receive a requeue notification. The requeue notification may indicate that the contributor 110 failed to respond and that the contributor 110 has been put back into the queue.

Figure 5:
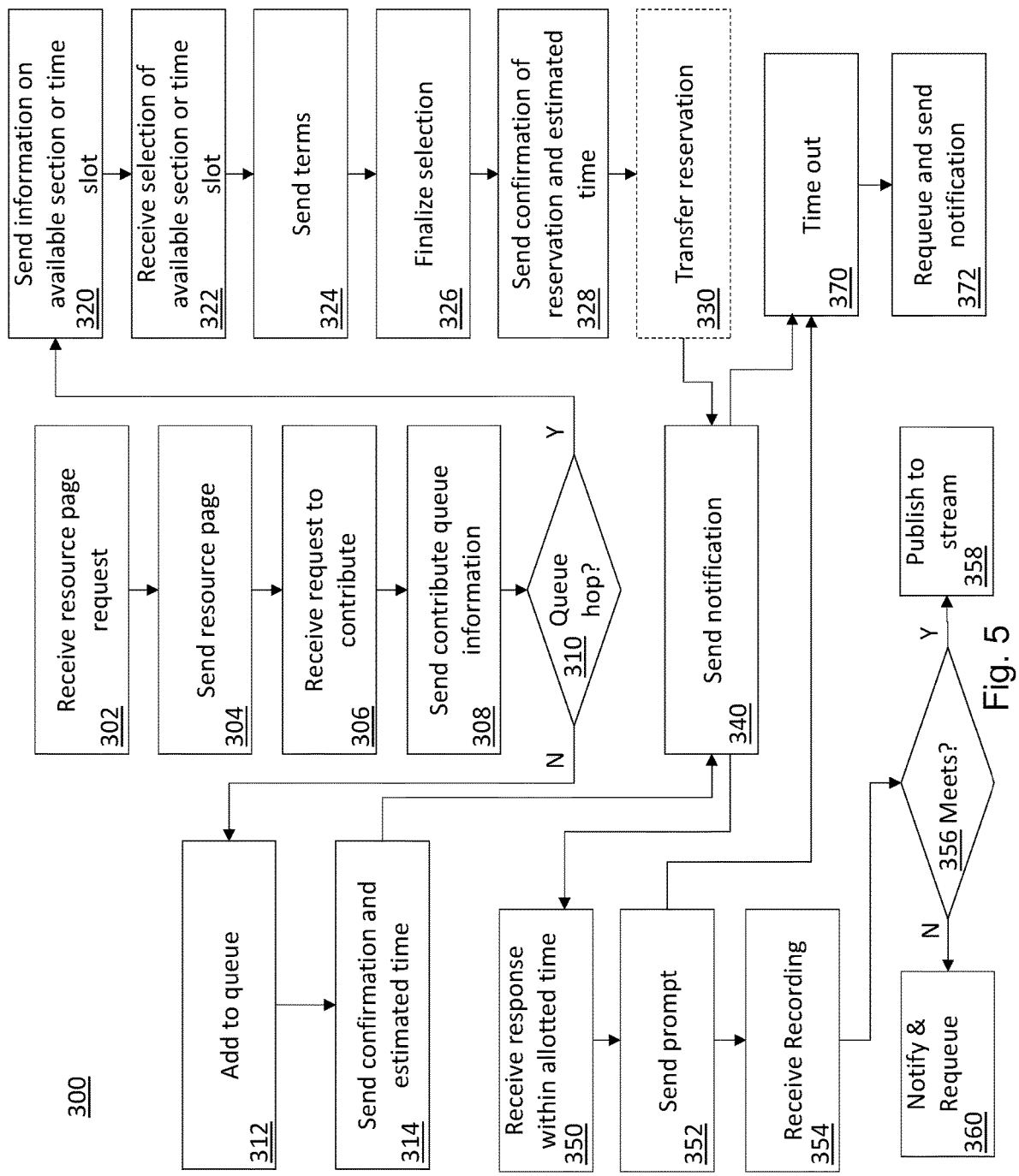
FIG. 5 illustrates a flow diagram for a process of a server providing a user-contributed media stream system, in accordance with some embodiments.

FIG. 5 illustrates a flow diagram for a process 300 of a server 120 providing a user-contributed media stream system. At 302, a request can be received by the server 120 from a contributor 110 for an information page related to a collaborated performance of a resource. At 304, the server 120 can send the information page from the server 120 to the contributor 110. At 306, the server 120 can receive a request to contribute to the user-contributed media stream. For example, the information sent at 304 can include link information for receiving a request to contribute to the user-contributed media stream. In response, at 308, server 120 can send information to the contributor 110 about the queue.

The information sent at 308 can include information about how many contributors are in the queue, what the current expected wait time is, the usernames or IDs of the contributors in the queue, what percentage of the resource sections are reserved, what percentage the progress of the live master stream is, and so forth. The server 120 can determine what the estimated wait time is based on the number of users in the queue, and an average estimated length for each resource section. For example, if there are 150 users in the queue, and each resource section is estimated to take 5 minutes, then the estimated wait time for a person entering the back of the queue is approximately 5×150=750 minutes.

In some embodiments, if the queue is empty or has only a few people in the queue, then the server 120 can offer points to contributors to join the queue. For example, some resource sections may be difficult to read or may be disinteresting for some users associated with the contributors 110. To encourage participation, the server 120 can pay points to contributors 110 for users to participate, and then the contributors 110 may use those points in a reservation transaction to reserve a passage that is more interesting or desirable for the user. In an example, the server 120 may send as part of the queue information an offer that if the contributor joins the queue, and completes an assigned resource section, then the contributor may receive a designated number of points for participation.

The server 120 can receive, at 310, an indication from the contributor 110, whether the contributor 110 will hop into the queue at a more advanced position or reserve a particular resource section. At 320, if the server 120 receives an indication that the contributor 110 will not hop into the queue, the server 120 will add the contributor 110 to the queue, at 312, at the default position at the end of the queue. Then, at 314, the server 120 will send a confirmation and estimated time for their queue position to the contributor 110. The server 120 can optionally provide the live master stream to the contributor 110. In some embodiments, if the queue is empty, the server 120 can send a prompt, for example at 352, to the contributor 110 so that the contributor 110 can receive the next resource section.

Returning to flow control element 310, if queue hopping is pursued, the flow will continue to 320 and information on queue hopping can be sent to the contributor 110 for an available section or time slot. The contributor 110 can then receive the information for the available resource sections or time slots. The server 120 can maintain the status of the time slot reservations and the resource reservations.

Figure 8:
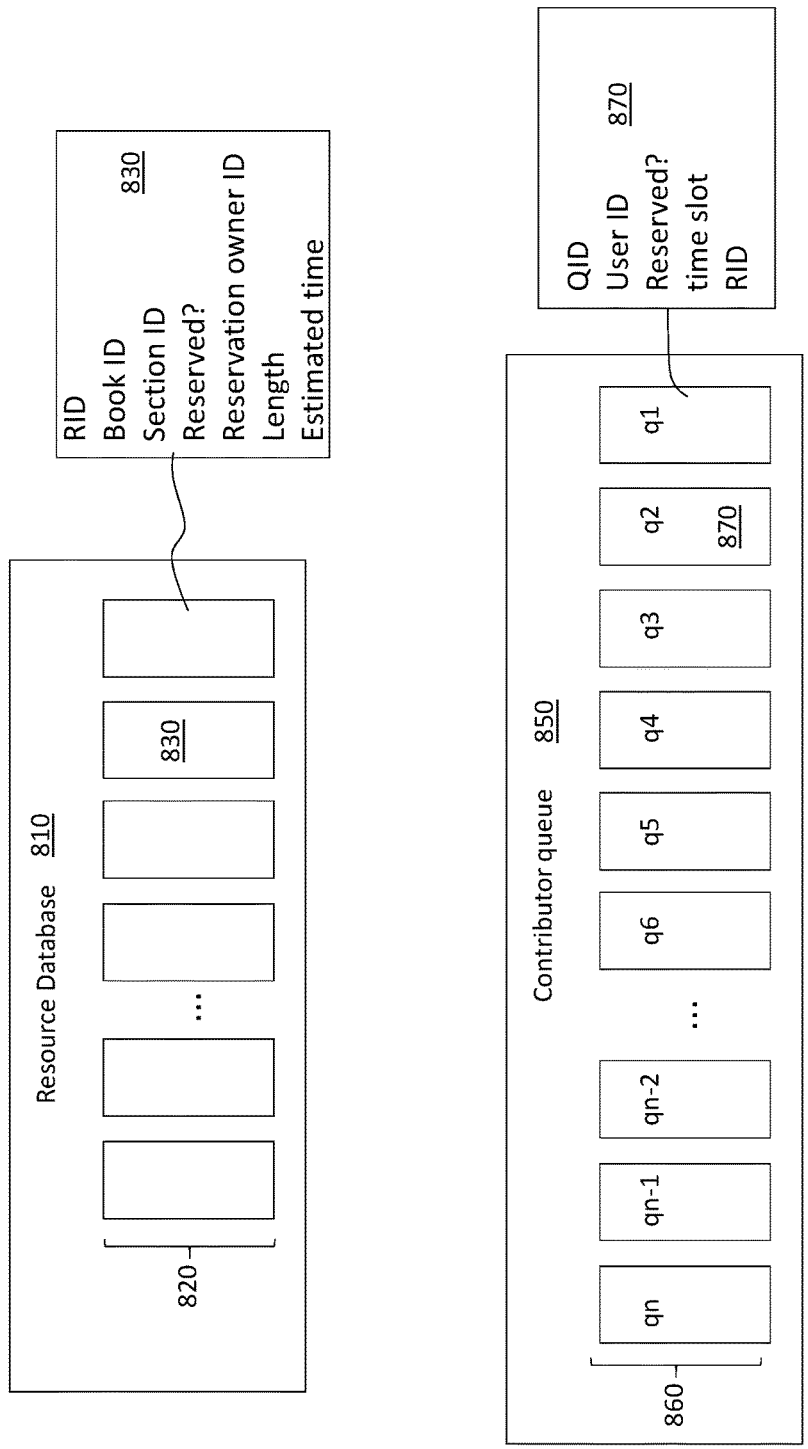
FIG. 8 illustrates an example implementation of a resource database and a contributor database in accordance with some embodiments.

Turning briefly to FIG. 8, an example implementation of a resource database 810 and a contributor queue 850 are illustrated. Unless otherwise indicated, when the disclosure above refers to a queue, it is referring to the contributor queue 850, which is a group of contributors which are lined up in generally a first-in-first-out FIFO manner. Utilizing priority placing or queue hopping, the server 120 can manipulate the order of the contributor queue 850 so that particular contributors 110 can be placed at the front or toward the front of the queue when they would have otherwise been placed at the back of the queue. It should be appreciated that the discussion of the resource database 810 and contributor queue 850 are provided for the purpose of understanding and that management of the various components may be implemented utilizing other queues or databases.

The resource database 810 can include a group 820 of resource sections 830, each of which represent, for example, a passage from the resource. Each of the resource sections 830 can be a record that includes a unique resource ID (RID), a Book ID, a section ID, an indication if the resource section has been reserved, if applicable, a reservation owner ID, a length, for example in words, and an estimated time for example in seconds or minutes. The estimated time can be based, for example, on the length. The server 120 will maintain the resource database 810 such that the next consecutive resource section 830 is provided to the next consecutive contributor so that the resource sections 830 are published to the live master stream in order. In some embodiments, the server 120 can prompt contributors 110 in an overlapping manner so that the time spent to begin recordings, end recordings, upload recordings, review recordings, redo recordings, and so forth, can be removed, so that the live master stream can flow neatly from one resource section to the next resource section without lag. If the resource section has a reservation owner ID associated with it, the server 120 can match the contributor queue 850 with the resource database 810 such that the reservation owner contributor is prompted when the reserved resource section is up for being performed. In another embodiment, a separate resource reservation database or queue may be maintained to assist the server 120 to maintain the correct correspondence between the contributor queue 850 and the resource database 810.

The contributor queue 850 can include an element queue 860 of contributor queue elements 870, each of which includes information for a contributor assigned to that queue element 870. The queue length can be n-contributors long, where n is the number of contributors in the queue. In general, the contributor queue 850 is a FIFO queue where when the queue is triggered or popped, for the next resource section, q1 will come out of the contributor queue and the contributor 110 associated with the queue element 870 will be prompted to provide the next resource section. The remaining queue elements 870 will be shifted so that q2 becomes q1, q3 becomes q2, and so forth. If a contributor reserves a time slot or pays to be squeezed into the queue, a new queue element 870 can be inserted logically into the queue between any of the two queue elements. For example if a contributor 110 is squeezed into the contributor queue 850 between q4 and q5, the q5 can be shifted to q6, q6 to q7, and so forth. This can be done using common programmatic techniques, such as adjusting pointers in neighboring queue elements 870 as necessary.

The server 120 can also maintain the reserved resource sections by aligning the queue elements 870 with the reserved resource sections, for example, by placing the contributors 110 who have reservations in the proper order in the contributor queue 850. For example, if the last queue element qn is predicted to read the resource section 782 and a contributor has reserved resource section 811, then the contributor can be placed at the back of the contributor queue 850 until the last queue element qn is predicted to read the resource section 812, who will then be placed behind the contributor who reserved resource section 811.

If another contributor reserves a resource section in front of resource section 811, for example, resource section 753, then the server 120 can adjust the queue so that the contributor who has resource section 811 reserved is not bumped back to the queue element associated with the resource section 812. The server 120 can adjust the queue as needed after every change to the queue or can check and adjust the queue as needed based on other considerations. For example, the server 120 can check a first section of the queue, for example, the first 20 or 30 queue elements 870, to ensure that they correspond to the proper resource sections, and rearrange the first section after every manipulation of the queue or after every so many, such as 10, queue triggers.

In a similar manner, the server 120 can maintain the reserved time slots by aligning the queue elements 870 with the reserved time slots, for example, by placing the contributors 110 who have reservations in the proper order in the contributor queue 850. For example, contributors with time slot reservations that occur after the estimated time for the last queue element 870 (without a reservation) can be placed in time slot order at the end of the queue, and contributors with time slot reservations that are estimated to occur somewhere in the queue other than at the back of the queue can be squeezed into the contributor queue 850 at the appropriate location.

The server 120 can also negotiate between the reserved resource sections and the time slot reservations. For example, the server 120 can insert a reservation for a time slot before or after a reservation for a resource section, giving priority to the reservation for the resource section.

It should be appreciated, that while one way of providing the queue management has been discussed, the particulars can be altered within the scope of the disclosure to achieve contributor and resource section management.

Returning to FIG. 5, the server 120 can, at 322, receive a selection from the contributor 110 for a reservation for a resource section or a time slot. Depending on the status of the resource section or time slot selected, the server 120 can provide back to the contributor, at 324, terms for the selection. For example, if the selected resource section or time slot is available, then the server 120 can send a confirmation of the cost in terms of money or points to complete the reservation. If the selected resource section is an auction-type of reservation, then the server 120 can send a confirmation of the bid or provide additional auction details. At 326, the server 120 can receive a finalized selection with an agreement of the terms from the contributor 110. Then, at 328, the server 120 can send a confirmation to the contributor 110 of the reservation and an estimated time for the performance of the reserved time slot or resource section. At, 330, upon reservation, if the reservation is transferred from another contributor, the server 120 can assign or transfer points or money from the new contributor to the previous contributor.

When a contributor is approaching the front of the queue, the server 120 at 340 can send a notification to the contributor that their queue time or reservation time is approaching. The server 120 can then at 350 receive a response within an allotted time or time out waiting for a response at 370. If the response is timely received, then at 352 the server can send a prompt to the contributor 110 which may include, for example, placing the contributor in a staging area and providing the contributor text corresponding to the resource section to be performed. The contributor creates the recording and the server 120 receives the recording at 354.

Next, at 356, the server 120 can analyze the recording to see if it meets system and community guidelines. The system and community guidelines may be a set of rules that the recording must keep in order to be used. For example, a video with a lot of background audio noise may be rejected, a video where a face is not showing may be rejected, or a video where the audio does not match the associated resource segment may be rejected. If so, then at 358, the server 120 can cause the recording to be added to the live master stream at the appropriate time. If not, then the server 120 can requeue the contributor and notify the contributor 110. In some cases, the server 120 can place the contributor 110 back into the staging area, i.e., back to 352, sending a prompt to the contributor with a message indicating why the recording was rejected. The server 120 can then allow the contributor to re-attempt the recording. In some cases, the server 120 can place the contributor 110 back to the end of the queue or at another place in the queue, and send the contributor 110 a notification indicating why the recording was rejected with an updated time according to the new queue position.

If the contributor fails to respond, then, at 372, the contributor 110 may be notified and requeued, allowing the next contributor to provide a recording of the next resource section. The contributor 110 that did not respond can be placed back into the queue.

The server 120 can begin the process 300 again with another contributor. In some embodiments, the server 120 can overlap the process 300 amongst contributors so that the live media stream does not have long breaks between resource sections provided by different contributors.

Figure 9:
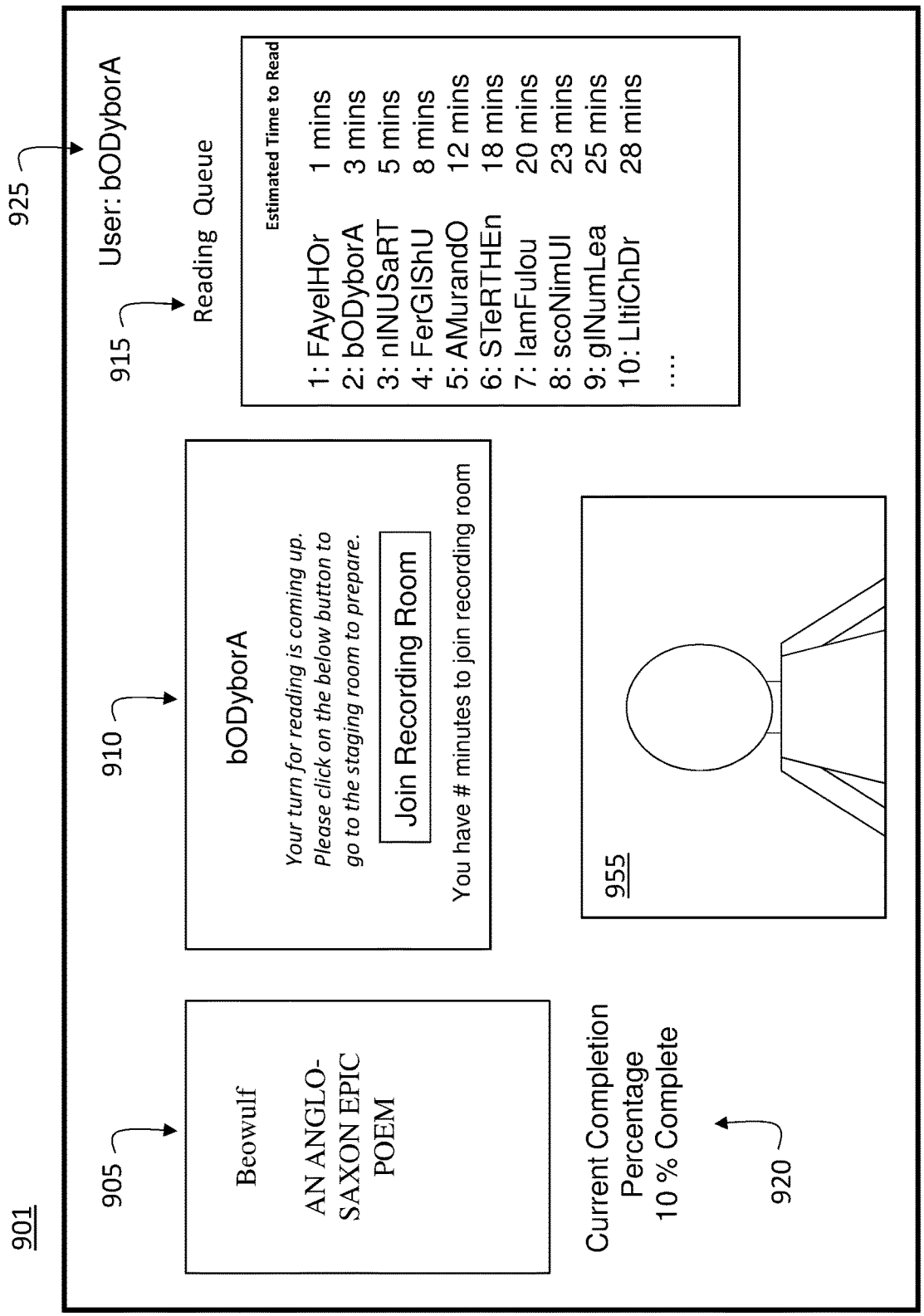
FIGS. 9 through 11 illustrate various user interfaces, in accordance with some embodiments.
Figure 10:
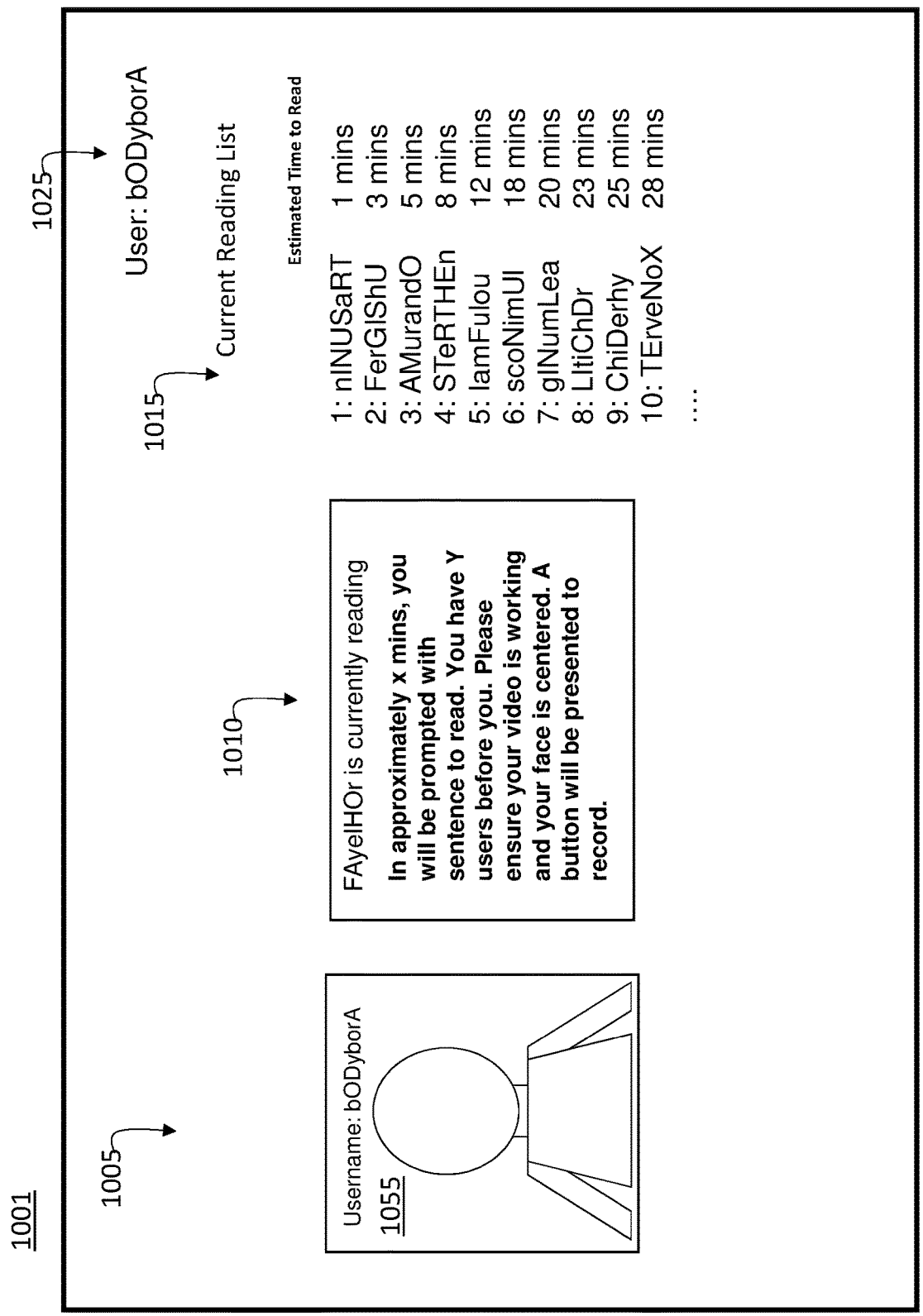
Figure 11:
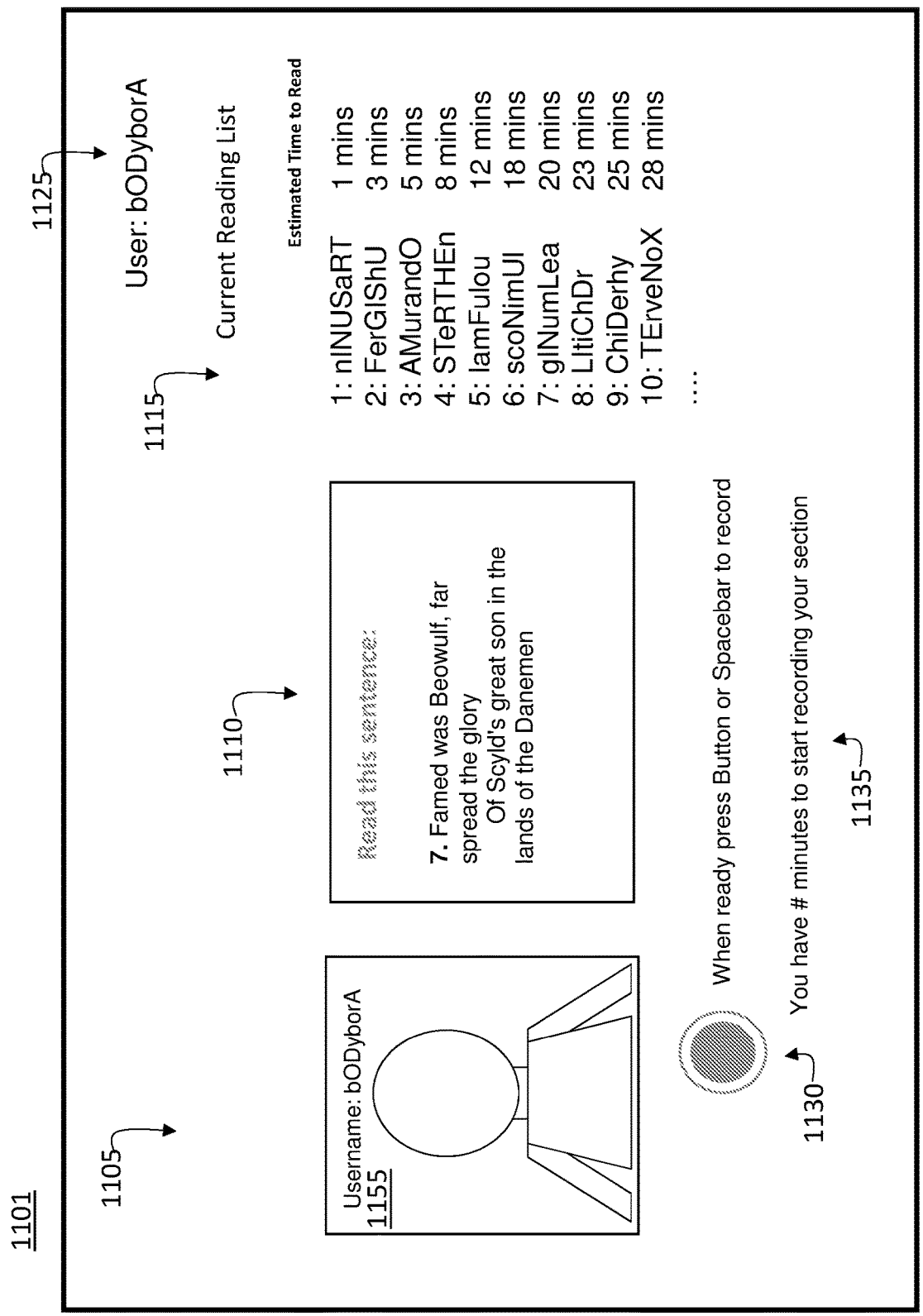

FIGS. 9-11 illustrate a user interface 901, 1001, and 1101, that represent a notification interface, staging interface, and recording interface, respectively. The user interfaces 901, 1001, and 1101 may be displayed on a display of the contributor 110. The server 120 can provide information to the contributor 110, which is then rendered in the contributor 110 into the user interfaces 901, 1001, and 1101.

In FIG. 9, the user interface 901 includes a landing page for the acknowledging the notification from the server 120 (e.g., FIG. 4, element 250, and FIG. 5, element 350). The user interface 901 may include a title region 905 where a title for the resource is displayed, an information region 910 which displays information regarding the status of the contributor 110 in relation to the upcoming recording, a queue region 915 which displays information regarding the queue, a status resource region 920 which displays information regarding the current status of the resource, a username region 925 which displays the current logged in username, and a video region 955 which can be configured to display the live master stream or a preview of the camera input to the contributor 110. The information region 910 can also provide a button which can provide input to the server 120 to provide a further response, e.g., at FIG. 4, element 250, to the notification, for example, indicating that the contributor is ready to enter the staging area and receive a prompt from the server 120.

In FIG. 10, the user interface 1001 includes a staging page for providing a prompt from the server 120 to the contributor 110 (e.g., FIG. 4, element 252, and FIG. 5, element 352). The user interface 1001 may include a video preview region 1005 where a video image 1055 may be displayed showing a preview of a camera input associated with the contributor. The user interface 1001 may also include information region 1010 which displays information regarding the status of the contributor 110 in relation to the upcoming recording, such as, for example, information regarding a contributor ID currently providing a resource segment to the server, how many other contributor IDs are ahead of the current contributor, and an estimated time until the system will be ready to receive a recording from the contributor. The user interface 1001 may also include a queue region 1015 which displays information regarding the queue, and a username region 1025 which displays the current logged in username. The user interface 1001 may also include information regarding providing a video preview of the associated camera input. In some embodiments, while the contributor 110 is waiting for the server 120 to provide a record button, the user interface 1001 can also include another video region which displays the current live media stream.

In FIG. 11, the user interface 1001 transforms into the user interface 1101. The information region 1010 is replaced with the information region 1110 which includes a copy of the resource section to be provided by the contributor. The queue region 1015 can update to the queue region 1115, providing an updated queue listing. A record button 1130 can appear which allows the contributor 110 to control the beginning and end of a recording. The user associated with the contributor 110 can, for example, press the record button 1130 or spacebar, and the recording will begin. Upon completion, the user can press the record button 1130 or spacebar again and the recording will stop. In some embodiments, beginning the recording streams the recording to the server 120. In some embodiments, beginning the recording saves a file locally to the contributor 110 and stopping the recording causes the saved file to upload to the server 120.

Embodiments provide a user contributed content system which manages contributors that provide recordings of sections of a resource, thereby creating a media representation of the resource sections. The user contributed content system takes the recordings and stitches them together into a live distributed performance. The user contributed content system provides the live stream.

While this description has been provided with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   sending a first prompt to a first contributor device;
   receiving a first recording in response to the first prompt from the first contributor device;
   sending a second prompt to a second contributor device;
   receiving a second recording in response to the second prompt from the second contributor device;
   examining the second recording against a set of rules;
   rejecting the second recording in response to the second recording failing to meet the set of rules;
   sending a third prompt in response to rejecting the second recording;
   receiving a third recording in response to the third prompt, wherein the second recording and the third recording represent a performance of a same passage of a text;
   appending the third recording to the first recording; and
   providing the first recording and the third recording in a media stream.

2. The method of claim 1, further comprising:
   prior to sending the first prompt, popping the first contributor device from a contributor queue; and
   shifting the contributor queue to put the second contributor device at a front of the contributor queue.

3. The method of claim 1, further comprising:
   receiving a selection from a third contributor device, the selection indicating a first passage of the text for reservation;
   marking the first passage as reserved for the third contributor device;
   receiving a selection from a fourth contributor device, the selection indicating the first passage for reservation;
   marking the first passage as reserved for the fourth contributor device; and
   providing a payment or a point value to the third contributor device.

4. The method of claim 1, further comprising:
   receiving a selection from a third contributor device, the selection indicating a first time range for reservation;
   marking the first time range as reserved for the third contributor device, wherein while marking the first time range as reserved, a current time is before the first time range;
   when the current time is within the first time range, sending a third prompt to the third contributor device;
   receiving a fourth recording in response to the third prompt from the third contributor device; and
   appending the fourth recording to the media stream.

5. The method of claim 1, further comprising:
   adding a third contributor device to a contributor queue;
   adding a fourth contributor device to the contributor queue, the fourth contributor device being added to the contributor queue in a position before the third contributor device; and
   appending a recording received from the third contributor device to the media stream after a recording received from the fourth contributor device.

6. The method of claim 1, wherein the third prompt is sent to a third contributor device.

7. The method of claim 1, wherein the third prompt is sent to the second contributor device.

8. A method comprising:
   receiving, on a first device, a list of contributor IDs from a server, the list including a first contributor ID associated with the first device;
   receiving, on the first device, a list of a plurality of passages of a text;
   selecting, on the first device, a passage of the plurality of passages of the text for reservation;
   receiving, on the first device, a media stream, the media stream including a first media element originating from a second device associated with a second contributor ID associated with the second device;
   receiving, on the first device, a prompt from the server and processing the prompt on the first device to cause the first device to display an interface including a video display region, the video display region displaying a preview view of a video input associated with the first device;
   recording, on the first device, a second media element from the video input and sending the second media element to the server, wherein the selected passage of the text corresponds to the second media element;
   receiving, on the first device, a confirmation from the server that the second media element was received; and
   receiving, on the first device, the media stream, the media stream including the second media element.

9. The method of claim 8, further comprising:
   prior to receiving the prompt from the server, receiving a notification from the server to request information from the server regarding the selected passage of the text.

10. The method of claim 8, further comprising reserving the selected passage of the text by purchasing the selected passage of the text from another contributor.

11. The method of claim 8, further comprising:
    from a list of time ranges, selecting a first time range, wherein a current time falls within a second time range before the first time range;
    waiting until the current time falls within the first time range; and
    receiving a notification from the server to request information from the server regarding the media stream.

12. The method of claim 11, further comprising:
    submitting a payment to reserve the first time range.

13. The method of claim 8, wherein the list of contributor IDs represents an ordered list of contributors, further comprising:
    requesting, to the server, to be added to a position in the list of contributor IDs which is not at a back of the list of contributor IDs.

14. The method of claim 13, wherein when the position is within a first number of positions from a front of the list of contributor IDs, a first price is associated with the request, and when the position is within a second number of positions after the first number of positions, then a second price is associated with the request, wherein the first price is greater than the second price.

15. A device including:
    a processor;
    a computer-readable medium;

a first set of instructions stored in the computer-readable medium, which when executed by the processor, cause the device to:
split a first source material into a plurality of passages;
provide a list of the plurality of passages to a first contributor device and to a second contributor device;
receive a first reservation for a first passage of the plurality of passages from the first contributor device;
receive a second reservation for a second passage of the plurality of passages from the second contributor device;
receive a first recording from the first contributor device;
append the first recording to a live media stream;
receive a second recording from the second contributor device; and
append the second recording to the live media stream immediately following the first recording, wherein the live media stream includes a partial performance of the first source material, the partial performance including a first performance from the first recording and a second performance from the second recording, wherein the first performance corresponds to the first passage of the plurality of passages, wherein the second performance corresponds to the second passage of the plurality of passages.

16. The device of claim 15, wherein the first set of instructions, when executed by the processor, further cause the device to:
maintain a correspondence between a queue of contributor devices and the plurality of passages such that the first contributor device at a beginning of the queue corresponds to the first passage, the second contributor device after the first contributor device in the queue corresponds to the second passage, a third contributor device after the second contributor device in the queue corresponds to a third passage of the plurality of passages, wherein the third passage immediately follows the second passage in the first source material.

17. The device of claim 16, wherein maintaining the correspondence between the queue of contributor devices and the plurality of passages includes moving the second contributor device to be in front of the third contributor device.

18. The device of claim 17, wherein the first set of instructions, when executed by the processor, further cause the device to:
place the third contributor device in the queue of contributor devices;
after placing the third contributor device, assign the second passage to the second contributor device; and
after assigning the second passage to the second contributor device, moving the second contributor device to be in front of the third contributor device.

19. The device of claim 18, wherein the first set of instructions, when executed by the processor, further cause the device to:
provide the live media stream to the second contributor device; and
trigger the third contributor device to send a third recording, the third recording corresponding to the third passage.

20. The device of claim 15, wherein the first set of instructions, when executed by the processor, further cause the device to:
display the first passage to the first contributor device while the first contributor device records the first recording; and
display the second passage to the second contributor device while the second contributor device records the second recording.

\* \* \* \* \*